US012725442B2

(12) United States Patent
Ahl et al.

(10) Patent No.: US 12,725,442 B2
(45) Date of Patent: Sep. 1, 2026

(54) OBJECT RECOGNITION METHOD AND TIME-OF-FLIGHT OBJECT RECOGNITION CIRCUITRY

(71) Applicant: Sony Semiconductor Solutions Corporation, Atsugi (JP)

(72) Inventors: Malte Ahl, Stuttgart (DE); David Dal Zot, Stuttgart (DE); Varun Arora, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 532 days.

(21) Appl. No.: 18/272,100

(22) PCT Filed: Jan. 13, 2022

(86) PCT No.: PCT/EP2022/050645
§ 371 (c)(1),
(2) Date: Jul. 13, 2023

(87) PCT Pub. No.: WO2022/152792
PCT Pub. Date: Jul. 21, 2022

(65) Prior Publication Data

US 2024/0071122 A1 Feb. 29, 2024

(30) Foreign Application Priority Data

Jan. 15, 2021 (EP) .................................... 21151753

(51) Int. Cl.
*G06V 10/774* (2022.01)
*G01S 17/894* (2020.01)
(Continued)

(52) U.S. Cl.
CPC ............ *G06V 40/10* (2022.01); *G01S 17/894* (2020.01); *G06T 11/00* (2013.01); *G06V 10/14* (2022.01);
(Continued)

(58) Field of Classification Search
CPC ...... G06V 40/10; G06V 40/113; G06V 40/28; G06V 10/14; G06V 10/774; G06V 10/82;
(Continued)

(56) References Cited

U.S. PATENT DOCUMENTS 10,186,038 B1 * 1/2019 Kluckner .................. G06T 7/70
10,803,310 B2 10/2020 Estrada et al.
(Continued)

FOREIGN PATENT DOCUMENTS

JP 2016503220 A 2/2016
JP 2018169690 A 11/2018
(Continued)

OTHER PUBLICATIONS

Song, Xibin, Fan Zhong, Yanke Wang, and Xueying Qin. "Estimation of kinect depth confidence through self-training." The Visual Computer 30, No. 6 (2014): 855-865. (Year: 2014).*
(Continued)

*Primary Examiner* — Carol W Chan
(74) *Attorney, Agent, or Firm* — XSENSUS LLP

(57) ABSTRACT

The present disclosure generally pertains to an object recognition method for time-of-flight camera data, including: recognizing a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

20 Claims, 9 Drawing Sheets

(51) Int. Cl.

| | |
|---|---|
| ***G06T 11/00*** | (2006.01) |
| ***G06V 10/14*** | (2022.01) |
| ***G06V 10/82*** | (2022.01) |
| ***G06V 40/10*** | (2022.01) |
| ***G06V 40/20*** | (2022.01) |

(52) U.S. Cl.
CPC ............ *G06V 10/774* (2022.01); *G06V 10/82* (2022.01); *G06V 40/28* (2022.01)

(58) Field of Classification Search
CPC .... G06V 10/772; G06V 20/597; G06V 20/64; G06V 2201/12; G01S 17/894; G06T 11/00
See application file for complete search history.

(56) References Cited

U.S. PATENT DOCUMENTS

| | | | | |
|---|---|---|---|---|
| 11,094,134 | B1 * | 8/2021 | Fallin | G06T 15/506 |
| 2014/0204013 | A1 | 7/2014 | O'Prey | |
| 2017/0060254 | A1 * | 3/2017 | Molchanov | G06F 18/25 |
| 2017/0364733 | A1 * | 12/2017 | Estrada | G06T 17/05 |
| 2018/0189951 | A1 * | 7/2018 | Liston | G06T 7/194 |
| 2020/0057831 | A1 | 2/2020 | Wu et al. | |
| 2020/0117953 | A1 | 4/2020 | Cooper | |
| 2020/0167161 | A1 | 5/2020 | Planche | |
| 2020/0175759 | A1 | 6/2020 | Russell et al. | |
| 2020/0294201 | A1 * | 9/2020 | Planche | G06V 10/30 |
| 2021/0383096 | A1 * | 12/2021 | White | G06V 20/64 |
| 2022/0101047 | A1 * | 3/2022 | Puri | G06V 10/26 |

FOREIGN PATENT DOCUMENTS

| | | | | |
|---|---|---|---|---|
| JP | 6719168 | B1 | 7/2020 | |
| WO | WO-2019113510 | A1 * | 6/2019 | G06N 20/20 |
| WO | 2020/056532 | A1 | 3/2020 | |
| WO | WO-2020117657 | A1 | 6/2020 | |

OTHER PUBLICATIONS

Aggarwal, Charu Neural Networks and Deep Learning 2018 Springer, ISBN: 3319944622; Abstract attached.

Goodfellow, Ian et al Deep Learning the MIT Press, 2016 ISBN: 0262035618; Abstract attached.

Haykin, Simon Neural Networks and Learning Machines Pearson, Nov. 18, 2008, ISBN: 0131471392; Abstract attached.

Kahn, Salman Guide to Convolutional Neural Networks for Computer Vision Morgan & Claypool, 2018, ISBN: 1681732785; Abstract attached.

Remondino, Fabio, et al TOF Range-Imaging Cameras 2013 Springer, ISBN 9783642275227; Abstract attached.

Yuki Hiramatsu et al., "Semantic segmentation using attention mechanism from class perspective", SSII 2019 [USB] Picture sensing technology, Dec. 31, 2019.

Ishida Yutaro et al., "Deep Neural Networks for Object Detection and Classification on Domestic Service Robots", IEICE Technical Report, The Institute of Electronics, Information and Communication Engineers, pp. 45-50.

Kim Wonjik et al., " Automatic Labeled LiDAR Data Generation based on Precise Human Model", 2019 International Conference on Robotics and Automation (ICRA) [online], IEEE, 2019 , pp. 43 49.

Ryosuke Kasahara, "The development method of a visual examination using image recognition", Part1 Visual examination technology of Chapter 2 by the foundation and the machine learning of image recognition technology, a machine design, Nikkan Kogyo Shimbun, Sep. 1, 2020, the 64th vol. No. 10, 11 to pp. 16.

International Search Report and Written Opinion mailed on Apr. 28, 2022, received for PCT Application PCT/EP2022/050645, filed on Jan. 13, 2022, 13 pages.

Maximov et al., "Focus on defocus: bridging the synthetic to real domain gap for depth estimation", arXiv:2005.09623v1 [cs.CV], May 19, 2020, 10 pages.

Rozantsev et al., "On Rendering Synthetic Images for Training an Object Detector", Computer Vision and Image Understanding, Jan. 12, 2015, pp. 1-30.

Planche et al., "DepthSynth: Real-Time Realistic Synthetic Data Generation from CAD Models for 2.5D Recognition", 2017 International Conference on 3D Vision (3DV), IEEE, Oct. 10, 2017, pp. 1-10.

Zanuttigh Pietro, "Time-of-Flight and Structured Light Depth Cameras: Technology and Applications", Springer, XP055912778, Jan. 1, 2016, pp. 99-107.

Benjamin Planche et al, "DepthSynth:Real-Time Realistic Synthetic Data Generation from CAD Models for 2.5D Recognition", Feb. 27, 2017.

Wonjik Kim et al, "Automatic Labeled LiDAR Data Generation based on Precise Human Model", Feb. 14, 2019.

* cited by examiner

OBJECT RECOGNITION METHOD AND TIME-OF-FLIGHT OBJECT RECOGNITION CIRCUITRY

CROSS-REFERENCE TO RELATED APPLICATIONS

The present application is based on PCT filing PCT/EP2022/050645, filed Jan. 13, 2022, and claims priority to EP Application Serial No. 21151753.7, filed Jan. 15, 2021, the entire contents of each are incorporated herein by reference.

TECHNICAL FIELD

The present disclosure generally pertains to an objection recognition method for time-of-flight camera data and time-of-flight object recognition circuitry for recognizing an object in time-of-flight camera data.

TECHNICAL BACKGROUND

Generally, methods for recognizing objects, based on depth images are known.

For such object recognition methods a neural network (NN), such as a convolutional neural network (CNN), may be trained with training data. For generating robustness of an algorithm, which the NN may generate for recognizing the object, the training data may need to be diverse.

For example, if persons should be recognized, the training data should represent different persons, possibly in different postures, and not always the same person.

The training data should further be extensive, such that a predetermined (large) amount of training data may be used for training, such that an efficient and robust training may be carried out.

For recognizing the object based on a depth image, depth data from time-of-flight (ToF) cameras may be used.

ToF cameras may measure a roundtrip delay of emitted light (which is reflected at a scene (e.g. object)) which may be indicative of a depth, i.e. the distance to the scene.

The roundtrip delay may be determined with different methods, such as direct time-of-flight (dToF), in which a time of the roundtrip delay is directly measured, based on a timing histogram. dToF may be based on a SPAD (single photon avalanche diode) technology, as generally known.

Furthermore, time-of-flight depth images may be based on indirect ToF (iToF), in which a phase-shift between emitted modulated light and its reflection is determined, wherein the light may be de-modulated at an image sensor (typically based on a plurality of CAPDs (current assisted photonic demodulators).

Although there exist techniques for recognizing an object, it is generally desirable to provide an object recognition method and object recognition circuitry.

SUMMARY

According to a first aspect, the disclosure provides an object recognition method for time-of-flight camera data, comprising:

recognizing a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

According to a second aspect, the disclosure provides time-of-flight object recognition circuitry for recognizing an object in time-of-flight camera data, configured to:

recognize a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
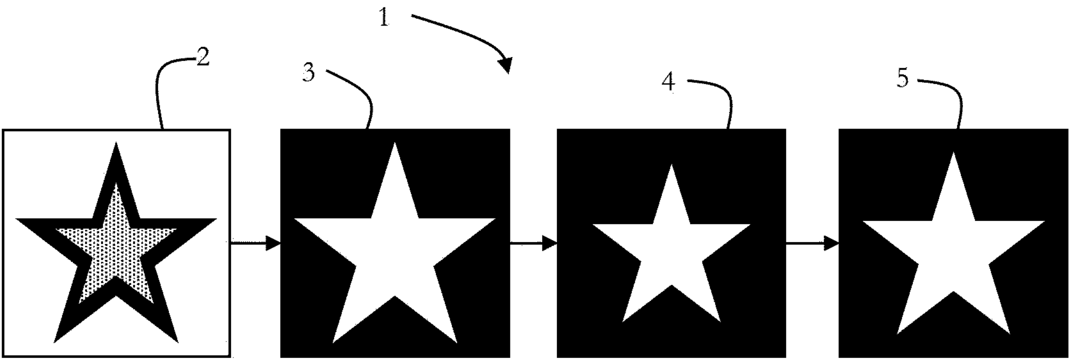
FIG. 1 shows an embodiment of the present disclosure of a method of how a simulated object is masked.

Before a detailed description of the embodiments starting with FIG. 1 is given, general explanations are made.

As mentioned in the outset, it is generally known to perform object recognition based on time-of-flight data.

As also mentioned, training data may need to be sufficiently diverse and extensive. For instance, for gesture recognition, several individuals may be required in order to generate a data set with sufficient diversity. Furthermore, the data may need to be labelled manually.

Hence it has been recognized that existing methods may be time-consuming and inefficient.

However, a diverse and extensive training data set may be considered as crucial for performing object recognition successfully (or for generating a robust object recognition algorithm/model).

It is known to use hardware equipment which may simplify the labeling in order to generate new sets of data (e.g. using a pedal which is pressed while making a certain gesture with the hand, or using advanced hardware systems with position sensors on fingers, hand, arm, head, or the like).

However, such equipment may require effort and time to be set up, may be expensive and may not be available, sharable or transportable (which may be unfavorable when working at home).

Thus, it has been recognized that training data may be generated based on a combination of synthetic (simulated) object data and based on real ToF (camera) data, wherein the synthetic data may be altered artificially in order to create a high diversity and extensiveness in the training data.

Furthermore, it has been recognized that known methods may be limited by a bias. For example, a zebra on a green grass background may not be well detectable/recognizable by a known object recognition method, because the training data set may only have contained zebras on yellow savanna background.

The present disclosure is not limited to this example. Similarly, if real ToF data for training a seatbelt detector includes information of a user of a car interacting with the seatbelt or adjusting the seatbelt, it may be learned that a hand on a chest of the user may be an indication of a buckled seatbelt. However, this method would detect the seatbelt every time the user only touches his or her chest, e.g. for opening or closing a jacket. Such an erroneous learning may be avoided by using synthetic training data.

Hence, it has been recognized that, when synthetic data is used, any object on any background may be generated (e.g. a zebra on a green, yellow, or any other background), such that a robust object recognition may be achieved.

Therefore, some embodiments pertain to an object recognition method for time-of-flight camera data, including: recognizing a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

The object recognition method may be carried out with object recognition circuitry according to the present disclosure, as will be discussed further below.

The time-of-flight camera data may include data acquired from a time-of-flight camera in a time-of-flight acquisition process, such as dToF, iToF, or the like. Hence, the time-of-flight camera data may be indicative of a depth of a scene (e.g. an object).

With an object recognition method according to the present disclosure, any predetermined object may be recognized. For example, the object recognition method may be used to only recognize one object, such as whether a driver is belted (i.e. the object could be defined as a person in combination with a security belt, or the like). In some embodiments, the object recognition method may be used to distinguish between multiple predetermined objects, such as different gestures of a hand. For example, different gestures may be indicative of different predetermined commands (e.g. in a context of home automation, game-play, tactical or military contexts, or the like).

The object recognition method may include recognizing a real object. The real object may be any object, as described above and may be represented by the time-of-flight camera data.

The recognizing may be based on a pretrained algorithm, which may be based on time-of-flight training data.

The time-of-flight training data may refer to data which are used for training the pretrained algorithm, e.g. by an artificial intelligence, in a machine learning process, or the like. Hence, the pretrained algorithm may be determined by having multiple sets of different scenes and objects to be recognized, such that the object recognition may be trained based on the different scenes and objects.

The time-of-flight training data may be generated based on a combination of real time-of-flight data and simulated time-of-flight data. For example, the real time-of-flight data may be deriving from a real time-of-flight acquisition and may be representative of a real scene. In some embodiments, the real time-of-flight data may be used as or be indicative of a background of an image which is represented in the time-of-flight training data.

When using real time-of-flight data as a background, it is only required (for hardware vision devices, such as a ToF camera) to record background (depth) images, which may further be reused for new ToF training data. Furthermore, already existing (depth) images may be used. Hence, an inexpensive way to train an object detection algorithm may be provided according to the present disclosure since less human resources and less hardware may be needed.

The simulated time-of-flight data may derive from a simulated time-of-flight measurement or may be purely simulated and generated so as to be compatible with the real time-of-flight data. The simulated time-of-flight data may be indicative of a simulated object, e.g. in a foreground of the scene represented in the time-of-flight training data.

Furthermore, the simulated time-of-flight data are generated, in some embodiments, by applying a mask on synthetic overlay image data representing the simulated object.

The synthetic overlay image data may be representative of a synthetic overlay which may pertain to a first instance of the simulated object, i.e. based on simulated raw depth data which may represent an idealistic object.

Since it has been recognized that using an idealistic object may lead to errors in an object recognition algorithm, a mask may be applied to the synthetic overlay image data.

Generally, the mask may cause the simulated object to appear more realistic and the simulated object may be adaptable based on the mask.

Thereby, a masked simulated object may be generated.

Furthermore, the mask may be based on the synthetic overlay image data. The synthetic overlay image data may be adapted, such that the mask may be generated and such that the synthetic overlay may be altered/modified based on a characteristic (e.g. an edge, a distance/depth, a contour, or the like) of the simulated object/synthetic overlay.

The mask may allow that the synthetic overlay (e.g. gesture, seatbelt, or any other object which might or should be recognized) is well embedded into the background image and that the texture of the synthetic overlay is still preserved.

For example, a binarized image (binarized mask) may be generated (computed), for example by assigning a background (of the synthetic overlay) to a binary zero (which may be displayed as black, for example) and the foreground (i.e. the simulated object) to a binary one (which may be displayed as white, for example). Thereby, a binarized synthetic overlay may be generated.

In another example, an erosion (e.g. a removal of edges, a smoothing, or the like) may be applied to the synthetic overlay (thereby generating an eroded synthetic overlay) or to the binarized masked synthetic overlay (thereby generating an eroded binarized masked synthetic overlay) may be applied.

In a further example, a blurring (e.g. Gaussian blur, average blur, box blur, lens blur, motion radial blur, shape blur, smart blur, surface blur, field blur, iris blur, tilt-shift, or the like) of the synthetic overlay, the binarized synthetic overlay, the eroded synthetic overlay, or the eroded binarized synthetic overlay may be applied.

Hence, different masking methods may be envisaged, which may be combinable with each other. Furthermore, the ordering of the application of the different masking methods may lead to different masked simulated objects. For example, first applying an erosion and then a binarization may lead to a different masked simulated object than first applying the binarization and then the erosion.

Hence, in some embodiments, the mask is based on at least one of a binarization of the simulated object, an erosion of the simulated object and a blurring of the simulated object.

The mask may additionally or alternatively be based on an application of at least one of the following to the simulated object: a random brightness change, a uniform brightness noise, and balancing the synthetic overlay image data based on the background.

In some embodiments, the random brightness change, the uniform brightness noise, and/or the balancing may be applied at any stage of the masking process, i.e. directly to the synthetic overlay, to the binarized synthetic overlay, and so on.

The random brightness change may be based on any random process which is known to the skilled person.

Furthermore, the uniform brightness noise may be based on any noise, such as 1/f-noise (pink noise) $1/f^2$-noise (Brownian noise), white noise, or any other type of noise, which may be represented by any noise power spectrum, as it is generally known.

As discussed herein, the mask (e.g. after the blurring process), may be used to balance, for every pixel of the resulting (output) image (of the time-of-flight training data), the "amount" of background image and synthetic overlay while preserving a texture of the synthetic overlay.

According to the present disclosure, it may be ensured that depth and/or texture information of the background and synthetic overlay may not be falsified/deteriorated by generating the mask.

Furthermore, if the depth of the synthetic overlay is changed randomly, a model may be trained which can detect objects at different distances to the ToF camera.

When a depth noise is applied to the synthetic overlay, a model may be trained which can detect an object, even if the ToF camera's depth channel image contains noise.

In some embodiments, the pretrained algorithm is based on at least one of a generative adversarial network, a convolutional neural network, a recurrent neural network, and a convolutional neural network in combination with a neural network with a long short-term memory.

Hence, the pretrained algorithm may be trained by an application of an artificial intelligence.

In the case of a generative adversarial network (GAN), a generator network part may be used to further increase the time-of-flight training data set (which may be used to train the algorithm). As it is commonly known, a GAN may include a generator network and a discriminator network. Both may be trained in a simultaneous loop, wherein the generator network may learn to generate new ToF training data and the discriminator network may learn to reject data generated by the generator network. In each training loop, the generator network may provide either a newly generated image or a real image to the discriminator. If both networks do not improve any further, the training may be stopped and the generator network may be used to generate better (synthetic) ToF training data than before this training, wherein the ToF training data may the be used for training the algorithm according to the present disclosure.

In the case of a convolutional neural network (CNN), depth channel images (of the real time-of-flight data) may be replaced with a disparity map from stereo cameras to train a CNN detector which uses a disparity image of a stereo camera.

In some embodiments, when a CNN is used, image sequences may not be saved as single images, but explicitly as an image sequence to use contained motion information to train the CNN with 3D convolution. Such a process may similarly be carried out with a recurrent neural network (RNN) or in a network with long short-term memory (LSTM) in combination with a CNN or any other type of artificial intelligence which is suitable for using motion information from sequential images.

In some embodiments, the time-of-flight training data further include at least one of bounding box information and pixel precise masking information.

Such time-of-flight training data may be used for training a neural network to predict a bounding box for object localization and/or an object mask for object segmentation.

In some embodiments, the time-of-flight training data represent at least one of time-of-flight image data and time-of-flight confidence data.

As it is generally known, confidence data may be indicative for a confidence image which may contain different information than the time-of-flight (depth) image (represented by the time-of-flight image data). For example, in iToF, the confidence may be determined based on a (simple) addition, a Pythagorean addition, a squared addition, or the like, of an I and a Q value (the I and Q value, respectively, being known to the skilled person per se).

Thus, the confidence data may be used for recognizing different objects than the image data may be used for. This may depend on the actual use-case. For example, in scenes with low depth contrast, confidence data may be more suitable for recognizing the real object, such that these data may be used for training such scenes.

For example, for recognizing whether a user of a vehicle is wearing a seatbelt, confidence data may be more suitable since the seatbelt may have roughly the same depth as the user's clothes, and thus, a depth resolution of a time-of-flight apparatus may not be sufficient for recognizing whether the user is wearing the seatbelt or not.

In other embodiments, in which there is sufficient depth resolution to be expected, the image data may be used, e.g. for gesture recognition, or the like.

Generally, according to the present disclosure, a neural network may be trained based on time-of-flight training data, to achieve a model well generalizing for application on time-of-flight camera data.

In order to perform the training, in some embodiments, a labeled depth channel validation set is envisaged.

A depth channel validation set may refer to a set of depth channel images (based on real time-of-flight data and/or time-of-flight camera data), which is annotated (e.g. manually or automatically) with information about a content of the image (i.e. the real object) that is supposed to be detected by an object recognition method according to the present disclosure.

Labeling the depth channel validation set may refer to an output of a perfect model which does not make wrong predictions (i.e. an idealistic case).

For training, a suitable configuration and selection of parameters could be chosen or determined in advance, such that a robust inference on the time-of-flight camera data may be achieved.

Thus, in some embodiments, the time-of-flight training data are further based on at least one of random data augmentation and hyperparameter tuning.

Random data augmentation may be envisaged for optimizing the neural network, which is chosen or selected, for example based on an optimizer, such as SGD (stochastic gradient descent), Adam (being an adaptive learning rate optimization algorithm), or the like.

A stochastic gradient descent algorithm may select a small subset of the time-of-flight training data (the small subset being referred to as a "batch") for performing gradient descent.

Random data augmentation may have the result that every image of a batch requested by the optimizer is transformed before the optimizer uses it to perform gradient descent. Hence, random data augmentation may refer to a process which is applied to the time-of-flight training data before the optimizer processes the time-of-flight training data. In other words: random data augmentation may refer to an image transform operation in order to perform gradient descent.

In some embodiments, random data augmentation includes at least one of the following: horizontal shifting, vertical shifting, rotation, and scaling (of the training image being represented by the time-of-flight training data, such that new time-of-flight training data may be generated).

Random data augmentation may lead to free undefined space of the training image, which may be filled up with a pixel repeating operation, for example.

Exemplarily, random data augmentation may include a horizontal and vertical shifting by a factor 0.3, a rotation range of forty-five degrees, and a scaling of a factor of 1.5.

For performing random data augmentation, in some embodiments, the synthetic overlay is generated in centered position of the image to be processed.

In some embodiments, random data augmentation may be applied after the time-of-flight training data is already generated, such that new time-of-flight training data is generated. In some embodiments, random data augmentation is applied to the time-of-flight training data while the training is performed.

The parameters of the pretrained algorithm may be called hyperparameters, which may be tuned in hyperparameter tuning according to the following:

It has been recognized, if a CNN is used for training, that a kernel size of a first two convolution layers, the size of a dense layer, and/or a learning rate used by an optimizer may have an impact on a robustness of an application of the pretrained algorithm to the time-of-flight camera data.

In order to improve the robustness, learned hyperparameters may be changed.

For example, a global search algorithm may be used, such as a multi-armed bandit algorithm, in which a set of different versions of the same model (i.e. the same algorithm) is generated by selecting different values from a predetermined range of predetermined hyperparameters.

During the training, one version of the model may be selected to be trained for a certain number of epochs or may select a previously selected version of the model to resume training.

With such a method, a metric may be determined which uses a depth channel validation set.

In other words: A hyperparameter tuner may need an objective or a feedback function to decide which model is selected to continue the training. As a metric, a validation accuracy of each model may be used as a metric in terms of a feedback function (without limiting the present disclosure in that regard). For determining the validation accuracy, a validation set may be required, which may be based on real recorded ToF images for providing a preference to model which work well on real ToF data.

The hyperparameter tuning may further use early stopping (as will be discussed further below) with the same metric and the same depth channel validation set.

Based on the present disclosure, not only depth images may be trained for, but also confidence images (as discussed above), gray scale images, color images, disparity maps from stereo camera, and images received from different wavelength of a ToF sensor (in case multiple light sources are used).

In some embodiments, the pretrained algorithm is further trained based on early stopping.

For early stopping, the labeled depth channel validation set (as discussed above) may be required. During training, the model's performance may be validated on the depth channel validation set by using a metric. If the model's performance on the depth channel validation set does not improve within a predetermined threshold, the training may be stopped and the version of the model that achieved the best performance so far may be used as the final model.

Hence, a robust inference on the time-of-flight camera data may be achieved.

In some embodiments, the real object includes a hand, as discussed herein.

In some embodiments, the method further includes: recognizing a gesture of the hand, as discussed herein.

According to the present disclosure, a small model with a small number of layers and parameters (compared to known object recognition models) may be obtained, which may have a sufficient performance on an embedded system (e.g. a CPU).

During training, the synthetic overlays and background images may be randomly chosen over entire input data sets (i.e. the ToF training data) to ensure that the diversity of the input data may be well presented in an output dataset.

Furthermore, it may be envisaged that at least one gradient filter is applied to at least one of the application of a random depth change to the synthetic overlay or the application of a uniform depth noise to the synthetic overlay, such that a robustness of a trained model (i.e. algorithm) may be further improved.

Furthermore, the synthetic overlay is not limited to be purely synthetic (e.g. purely artificially generated image/object data) as it may already be a combination of real and synthetic data (e.g. a real data indicative of horse with a synthetic/simulated data indicative of a saddle). In some embodiment, the ToF training data may be extended with labeled real ToF data.

Some embodiments pertain to time-of-flight object recognition circuitry for recognizing an object in time-of-flight camera data, configured to: recognize a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data, as discussed herein.

Circuitry may pertain to any wired or wireless connection between logic elements, such as a processor (e.g. CPU (central processing unit), GPU (graphics processing unit)), an FPGA (field programmable gate array), a camera (e.g. a time-of-flight camera), a computer, a server, or the like.

The present disclosure is not limited to the case that the object recognition happens within the camera which acquires the time-of-flight camera data, such that the object recognition may also be externalized, such as in an external processor (e.g. of a mobile phone, a car, or the like), a (remote) server, or the like.

In some embodiments, the mask is based on at least one of a binarization of the simulated object, an erosion of the simulated object and a blurring of the simulated object, as discussed herein. In some embodiments, the mask is based on an application of at least one of the following to the simulated object: a random brightness change, a uniform brightness noise, and balancing the synthetic overlay image data based on the background, as discussed herein. In some embodiments, the pretrained algorithm is based on at least one of a generative adversarial network, a convolutional neural network, a recurrent neural network, and a convolutional neural network in combination with a neural network with a long short-term memory, as discussed herein. In some embodiments, the time-of-flight training data further include at least one of bounding box information and pixel precise masking information, as discussed herein. In some embodiments, the time-of-flight training data represent at least one of time-of-flight image data and time-of-flight confidence data, as discussed herein. In some embodiments, the time-of-flight training data are further based on at least one of random data augmentation and hyperparameter tuning, as discussed herein. In some embodiments, the pretrained algorithm is further trained based on early stopping, as discussed herein. In some embodiments, the real object includes a hand, as discussed herein. In some embodiments, the object recognition circuitry is further configured to: recognize a gesture of the hand, as discussed herein.

Some embodiments pertain to an object recognition training method for time-of-flight camera data, including: generating time-of-flight training data based on a combination of real time-of-flight data being indicative of a background, and simulated time-of-flight data being generated by applying a mask on synthetic overlay image data representing a simulated object, thereby generating a masked simulated object, the mask being generated based on the synthetic overlay image data, as discussed herein.

The generating may be carried out on any circuitry which is suitable to perform a training of an artificial intelligence, such as any type of processor, server, computer, or the like. The generating may be carried out in an external entity as well as on the same entity which trains the algorithm. The generating may also be split, e.g. the synthetic overlay image data may be generated in one entity and the masking may be performed in another.

In some embodiments, the method further includes: obtaining the real time-of-flight data.

Generally, data according to the present disclosure may be obtained, for example, from a processor, a storage, a time-of-flight camera, a server, may be generated in circuitry carrying out the methods according to the present disclosure, or may be based on a combination of any of the above.

Accordingly, in some embodiments, the object recognition training method further includes: obtaining synthetic overlay image data, as discussed herein. In some embodiments, the object recognition further includes generating a mask based on the synthetic overlay image data, as discussed herein. In some embodiments, the object recognition training method further includes: generating the mask based on at least one of a binarization of the simulated object, an erosion of the simulated object and a blurring of the simulated object, as discussed herein. In some embodiments, the object recognition training method further includes: generating the mask based on an application of at least one of the following to the simulated object: a random brightness change, a uniform brightness noise, and balancing the synthetic overlay image data based on the background, as discussed herein. In some embodiments, the object recognition training method further includes: applying the mask on the synthetic overlay image data, thereby generating the simulated time-of-flight data, as discussed herein. In some embodiments, the object recognition training method further includes: combining the real time-of-flight data and the simulated time-of-flight data, thereby generating the time-of-flight training data, as discussed herein. In some embodiments, the object recognition training method further includes: generating an algorithm for recognizing the real object based on the time-of-flight training data based on at least one of a generative adversarial network, a convolutional neural network, a recurrent neural network, and a convolutional neural network in combination with a neural network with a long short-term memory, as discussed herein. In some embodiments, the time-of-flight training data further include at least one of bounding box information and pixel precise masking information, as discussed herein. In some embodiments, the time-of-flight training data represent at least one of time-of-flight image data and time-of-flight confidence data, as discussed herein. In some embodiments, the object recognition training method further includes: generating the time-of-flight training data further based on at least one of random data augmentation and hyperparameter tuning, as discussed herein. In some embodiments, the object recognition training method further includes: generating an algorithm for recognizing the real object based on early stopping, as discussed herein. In some embodiments, the real object includes a hand, as discussed herein. In some embodiments, the object recognition training method further includes: recognizing a gesture of the hand, as discussed herein.

Some embodiments pertain to a time-of-flight training data generation method including: creating a three-dimensional object or a depth image, e.g. with a 3D animation software.

In such a method, further, an animation sequence may be created, e.g. with a virtual camera of a 3D animation software to view the 3D object from different perspectives.

The animation sequence may be saved as single images in depth channel format with a black background from an alpha channel.

These single images may be referred to as "synthetic overlay".

With a real ToF camera, depth channel images (for a background) may be recorded, wherein it may be ensured that the images have a changing content for representing a variety regarding an application context.

Generally, in some embodiments, the full training data may be based on simulated data, i.e. also the background may be simulated and it is not always necessary to use real time-of-flight data. On the other hand, overlay images may be based on a real ToF acquisition, as well, such that the training data may be based purely on real ToF data. In such embodiments, a real overlay may be altered in a similar way as discussed above with respect to the synthetic overlay (e.g. binarization, erosion, and so on).

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is shown an embodiment of a method according the present disclosure of how a simulated object 2 (also referred to as a synthetic (depth) overlay) is masked, which is based on synthetic overlay image data, i.e. how a masked simulated object is generated, or how a mask is generated.

The simulated object 2 is binarized, as discussed herein, such that a binarized mask 3 (or a binarized simulated object) is generated. The binarized mask 2 is eroded, as discussed herein, such that an erosion mask 4 is generated (also referred to an eroded binarized simulated object). The erosion mask 4 is blurred with a Gaussian blur, such that a blurred mask 5 is generated (also referred to as a blurred eroded binarized simulated object).

Figure 2:
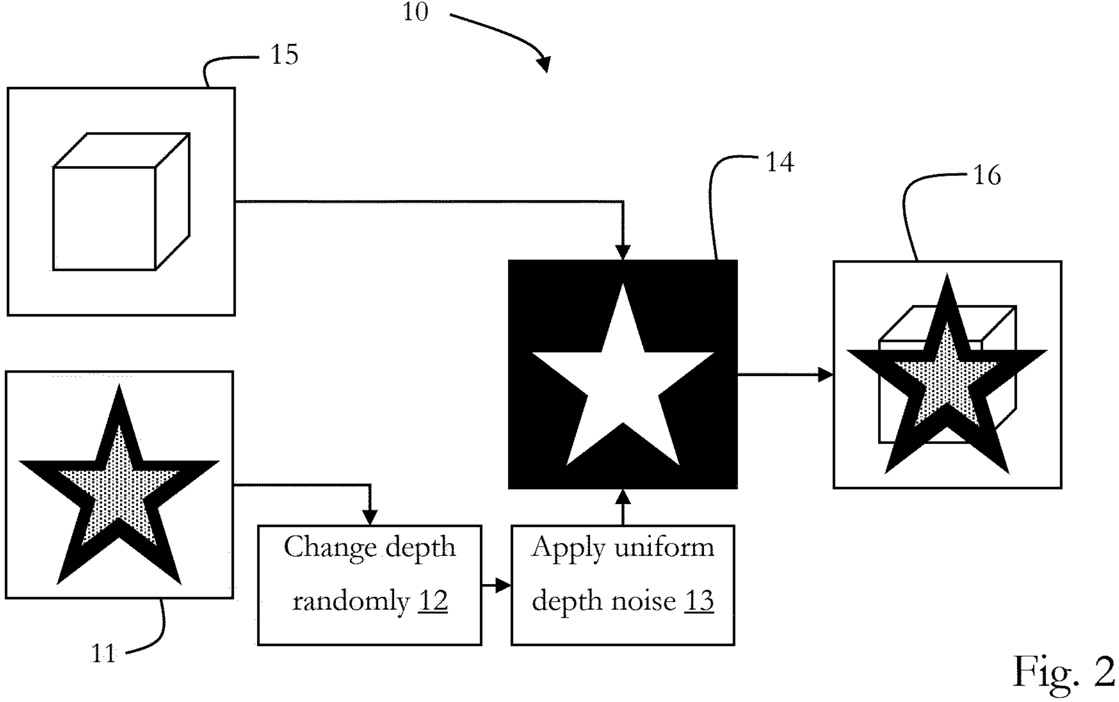
FIG. 2 depicts a method for generating time-of-flight training data according to the present disclosure.

FIG. 2 depicts a method 10 for generating time-of-flight training data according to the present disclosure.

A synthetic overlay 11, which is based on synthetic overlay image data, is processed, such that a depth is changed randomly, at 12. Furthermore, a uniform depth noise is applied, at 13, such that a blurred mask 14 is generated. The blurred mask 14 is applied to the synthetic overlay 11 (not shown), such that simulated time-of-flight data are generated, as discussed herein.

Furthermore, a background image 15, which is based on real time-of-flight data, is combined with the masked simulated object 14, whereby the real time-of-flight data and the simulated time-of-flight data are combined.

Thereby, time-of-flight training data are generated, which are represented in FIG. 2 as a time-of-flight image 16.

Figures 3A, 3B:
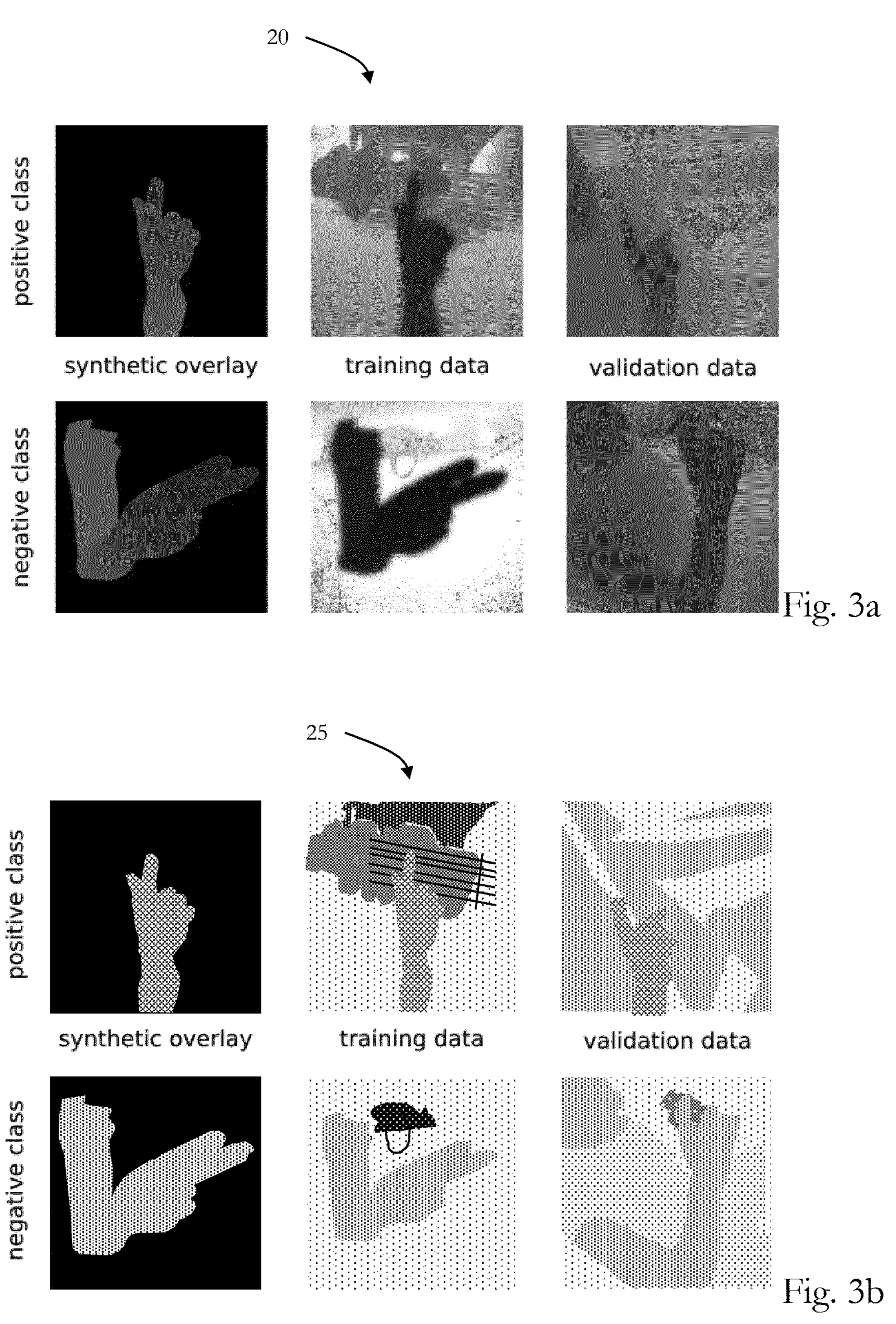
FIGS. 3*a* and 3*b* depict time-of-flight depth images which are used for training a binary CNN classifier recognizing a mute gesture performed by a driver or a passenger.

FIG. 3*a* depicts time-of-flight depth images 20 which are used for training a binary CNN classifier recognizing a mute gesture performed by a driver or a passenger.

The mute gesture is based on a gesture a person would perform in a natural conversation with another person to signal to the other person to stop talking.

In this embodiment, a ToF camera is mounted on a ceiling inside a car cabin. The CNN uses the depth channel image of the ToF camera to detect whether the mute gesture is performed by a user to stop the radio playing music.

The images 20 are divided into a positive class and a negative class, as generally known.

For each class, synthetic overlays are generated. Based on the synthetic overlays, time-of-flight training data (or a time-of-flight training image) are generated, as discussed herein.

For training, validation data are present, for which the object (in this embodiment a predetermined gesture) should be recognized (in the positive class) or recognized as not being shown (negative class).

FIG. 3*b* depicts a schematic representation of depth images 25 corresponding to the depth images 20 of FIG. 3*a*, such that a repetitive description is omitted.

Figures 4A, 4B:
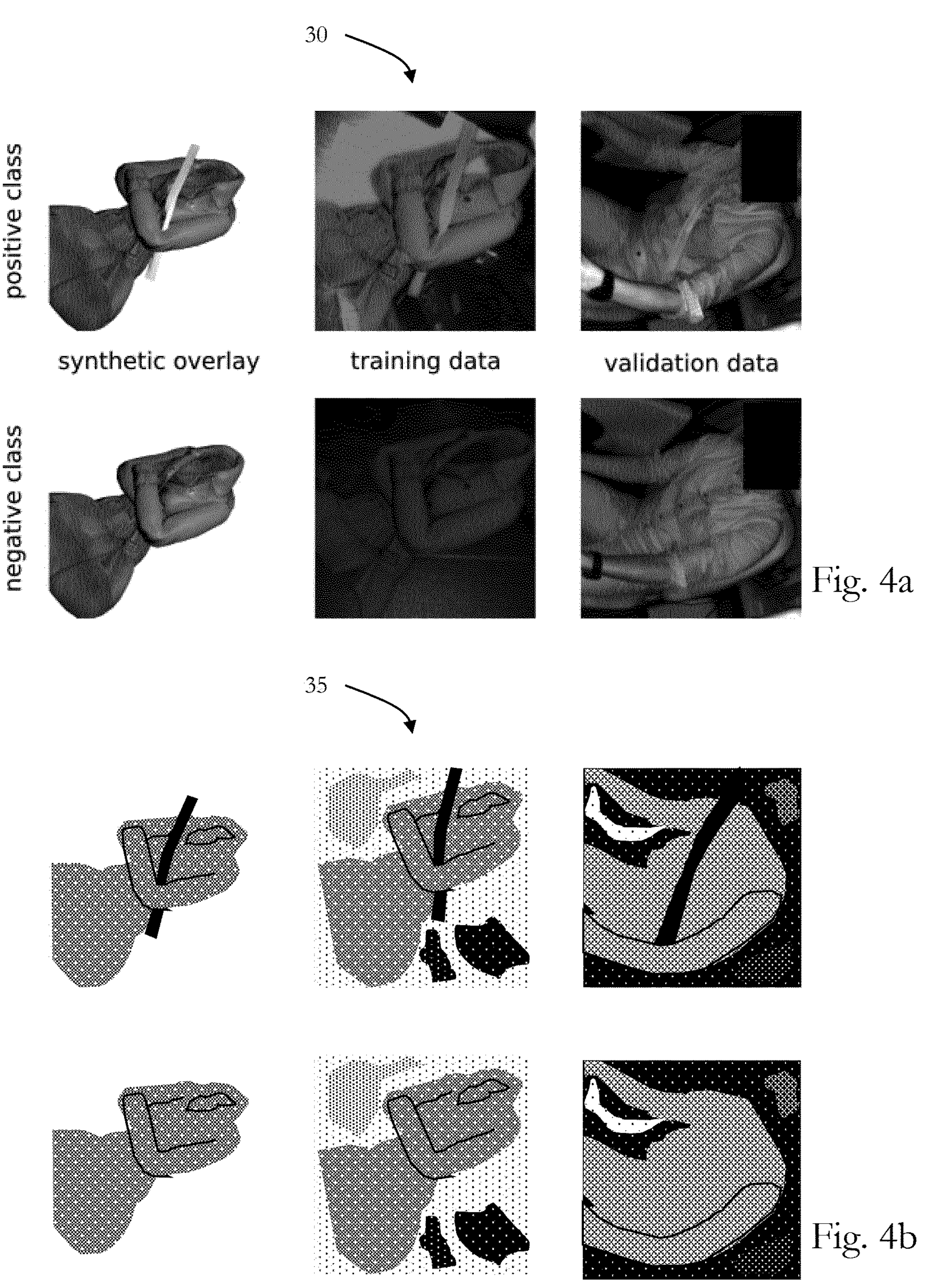
FIGS. 4*a* and 4*b* depict time-of-flight confidence images which are used for training a binary CNN classifier detecting a correctly buckled seatbelt.

FIG. 4*a* depicts time-of-flight confidence images 30 which are used for training a binary CNN classifier detecting a correctly buckled seatbelt.

As it is the case for FIGS. 3*a* and 3*b*, the images 30 are divided into a positive class and a negative class.

For each class, synthetic overlays (for example different kind of fabrics like a coat with a seatbelt (positive class) and a coat without a seatbelt (negative class)) are generated. Based on the synthetic overlay, time-of-flight training data (or a time-of-flight training image) are generated, as discussed herein.

In order to give a magnitude of synthetic overlays, the following non-limiting example is given:

Forty different synthetic fabrics may be used to generate eleven-thousand-and-two-hundred synthetic overlays in different assemblies with and without seatbelts may be envisaged. The synthetic overlays may be used to generate forty-two-thousand synthetic images per class with real ToF images as background. In the negative class, fifty percent of the images without an overlay may be used to achieve more robustness of a resulting model. Furthermore, eight thousand real ToF images may be added to each class, such that fifty-thousand images per class may be present, i.e. hundred-thousand images in total, which may constitute the ToF training data. Furthermore, eight-thousand (labeled) real ToF images per class may be used for validation. These validation images may, however, not be used as training images and may derive, e.g. from a different environment (e.g. a different car) with different people and fabrics that the other eight-thousand images added previously to the ToF training data.

Returning to FIG. 4*a*: The validation data of FIG. 4*a* are representative, in this embodiment, of an in-cabin time-of-flight image in which a user of a vehicle is belted, for which the object (in this embodiment a seatbelt over the user) should be recognized (in the positive class) or recognized as not being present (negative class).

In this embodiment, a CNN based seatbelt detector for ToF cameras is depicted, using a confidence channel image. The ToF camera is mounted on a ceiling inside a car cabin.

The CNN (i.e. the algorithm) uses the confidence channel image of the camera to detect whether the driver or passenger is correctly buckled up with a seatbelt.

FIG. 4*b* depicts a schematic representation of confidence images 35 corresponding to the confidence images 30 of FIG. 3*a*, such that a repetitive description is omitted.

Figure 5:
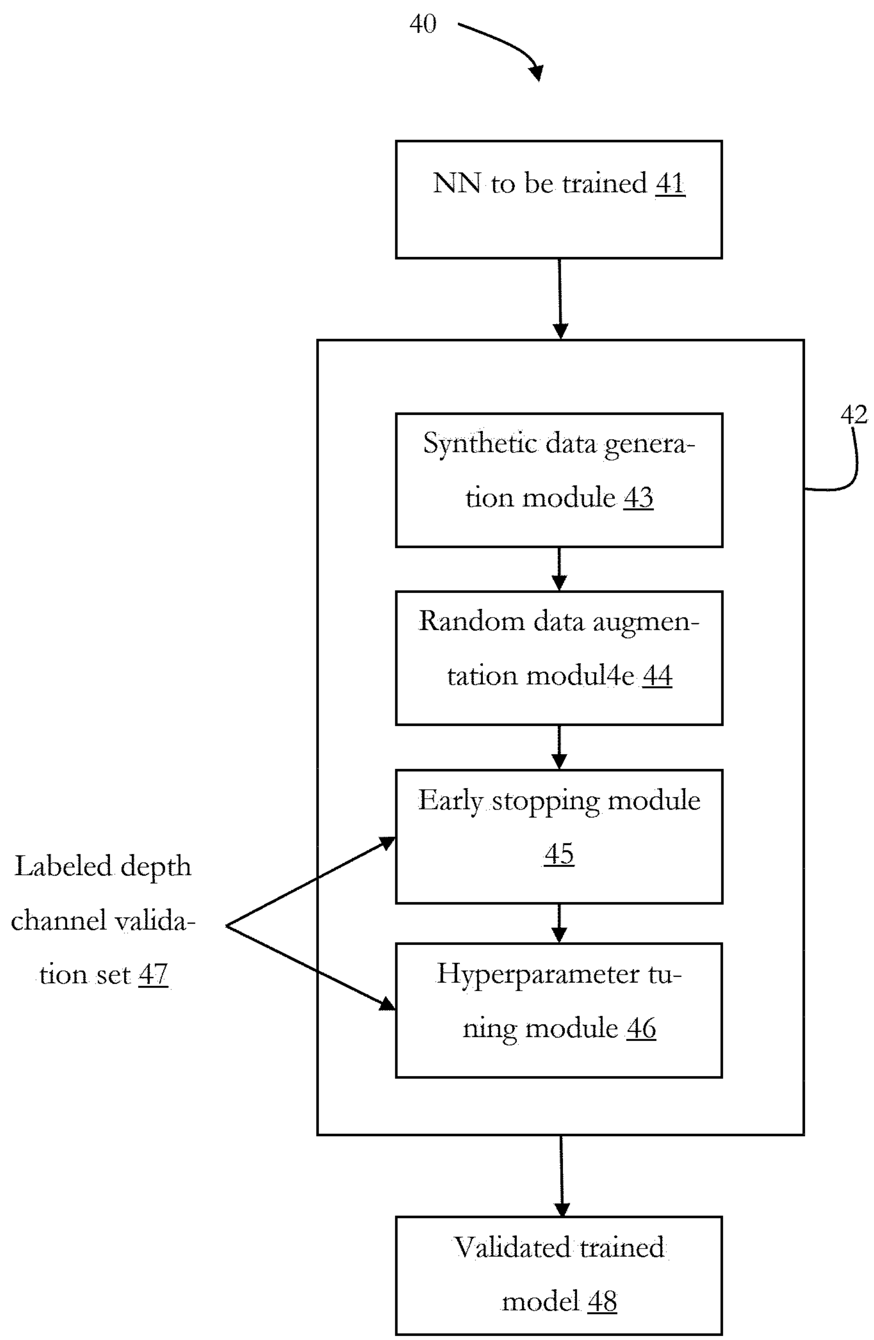
FIG. 5 depicts an embodiment of object recognition training circuitry according to the present disclosure in a block diagram.

FIG. 5 depicts an embodiment of object recognition training circuitry 40 according to the present disclosure in a block diagram.

The object recognition circuitry includes a neural network (NN) 41 to be trained.

Layers 42 of the neural network include a synthetic data generation module 43, configured to generate synthetic data (i.e. simulated ToF data), a random data augmentation module 44, configured to apply random data augmentation, as discussed herein, an early stopping module 45, configured to perform early stopping, as discussed herein, and a hyperparameter tuning module, configured to perform hyperparameter tuning, as discussed herein.

The early stopping module 45 and the hyperparameter tuning module 46 constitute a labeled depth channel validation set 47, as discussed herein.

As an output of the NN 41, a validated trained model 48 is generated.

Figure 6:
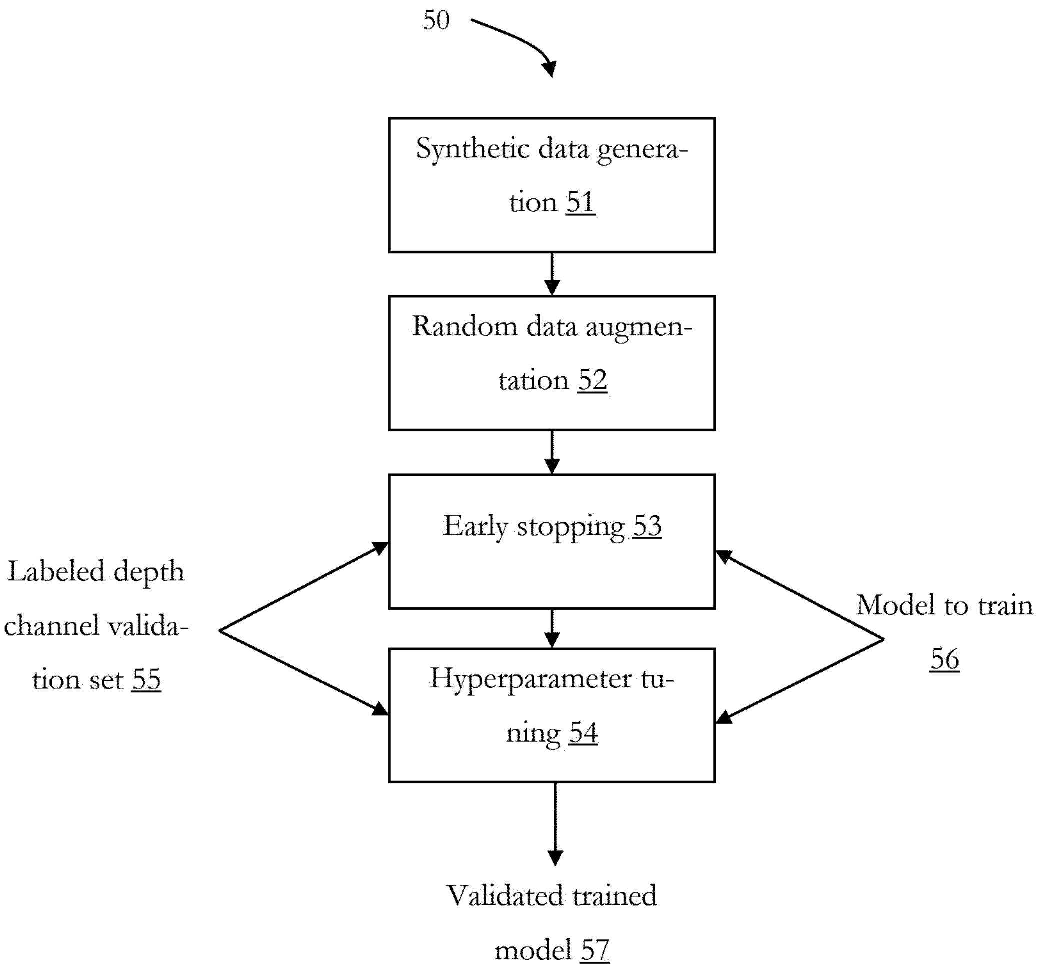
FIG. 6 depicts an object recognition training method according to the present disclosure in a block diagram.

FIG. 6 depicts an object recognition training method 50 according to the present disclosure in a block diagram, wherein the object recognition training method 50 is carried out by object recognition training circuitry 40.

At 51, synthetic data (i.e. simulated ToF data) is generated, as discussed herein, by masking a simulated object.

At 52, random data augmentation is carried out, as discussed herein.

At 53, early stopping is carried out, if necessary, as discussed herein.

At 54, hyperparameter tuning is carried out, if necessary, as discussed herein.

Thereby, at 55, a labeled depth channel validation set is obtained, and a model to train is obtained at 56.

At 57, a validated trained model is generated.

Figure 7:
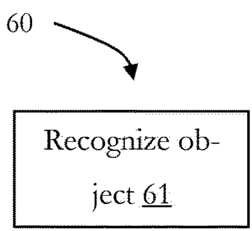
FIG. 7 depicts an object recognition method for time-of-flight camera data according to the present disclosure in a block diagram.

FIG. 7 depicts an object recognition method 60 for time-of-flight camera data according to the present disclosure in a block diagram.

At 61, a real object is recognized based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data, as discussed herein.

Figure 8:
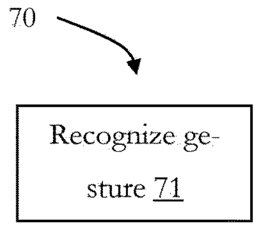
FIG. 8 depicts a further embodiment of an object recognition method for time-of-flight camera data according to the present disclosure in a block diagram.

FIG. 8 depicts a further embodiment of an object recognition method 70 for time-of-flight camera data according to the present disclosure in a block diagram.

At 71, a gesture of a hand (as an object) is recognized based on a pretrained algorithm, as discussed herein.

Figure 9:
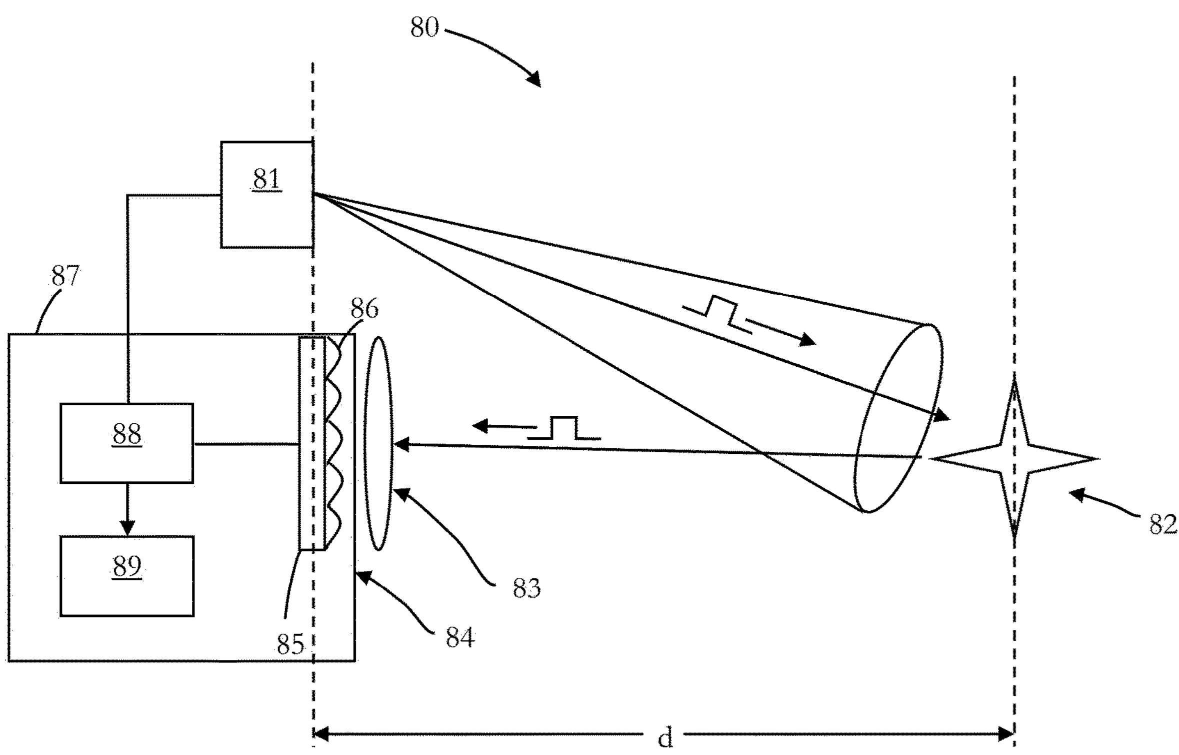
FIG. 9 illustrated an embodiment of a time-of-flight imaging apparatus according to the present disclosure.

Referring to FIG. 9, there is illustrated an embodiment of a time-of-flight (ToF) imaging apparatus 80, which can be used for depth sensing or providing a distance measurement, in particular for the technology as discussed herein, wherein the ToF imaging apparatus 80 is configured as an iToF camera. The ToF imaging apparatus 80 has time-of-flight object recognition circuitry 147, which is configured to perform the methods as discussed herein and which forms a control of the ToF imaging apparatus 80 (and it includes, not shown, corresponding processors, memory and storage, as it is generally known to the skilled person).

The ToF imaging apparatus 80 has a modulated light source 81 and it includes light emitting elements (based on laser diodes), wherein in the present embodiment, the light emitting elements are narrow band laser elements.

The light source 81 emits light, i.e. modulated light, as discussed herein, to a scene 82 (region of interest or object), which reflects the light. The reflected light is focused by an optical stack 83 to a light detector 84.

The light detector 84 has a time-of-flight imaging portion, which is implemented based on multiple CAPDs (current-assisted photonic demodulator) formed in an array of pixels and a micro lens array 86 which focuses the light reflected from the scene 82 to a time-of-flight imaging portion 85 (to each pixel of the image sensor 85).

The light emission time and modulation information is fed to the time-of-flight object recognition circuitry or control 87 including a time-of-flight measurement unit 88, which also receives respective information from the time-of-flight imaging portion 85, when the light is detected which is reflected from the scene 82. On the basis of the modulated light received from the light source 81, the time-of-flight measurement unit 88 computes a phase shift of the received modulated light which has been emitted from the light source 81 and reflected by the scene 82 and on the basis thereon it computes a distance d (depth information) between the image sensor 85 and the scene 82.

The depth information is fed from the time-of-flight measurement unit 88 to a 3D image reconstruction unit 89 of the time-of-flight image sensor circuitry 87, which reconstructs (generates) a 3D image of the scene 82 based on the depth data.

The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 10:
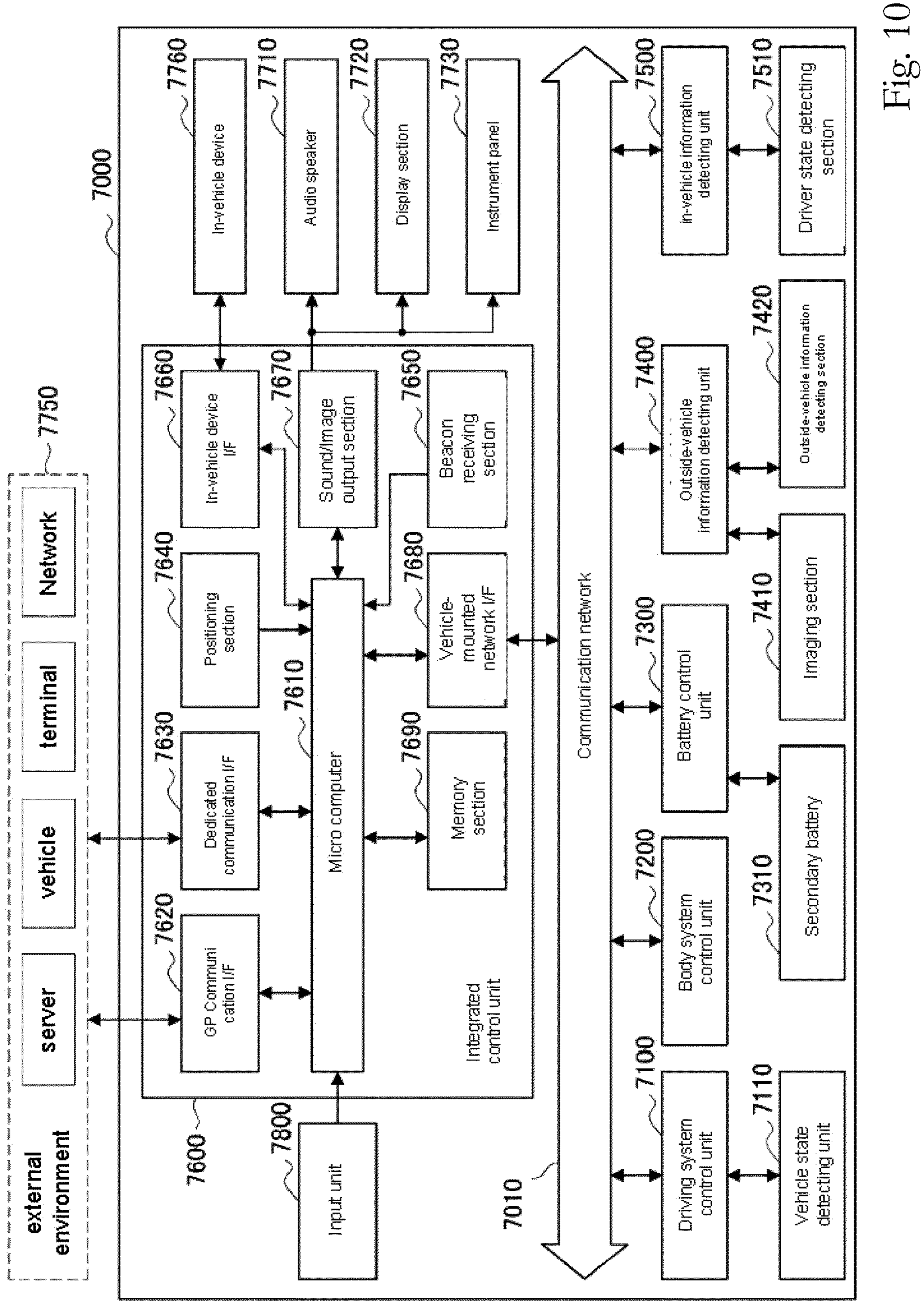
FIG. 10 is a block diagram depicting an example of schematic configuration of a vehicle control system.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 11:
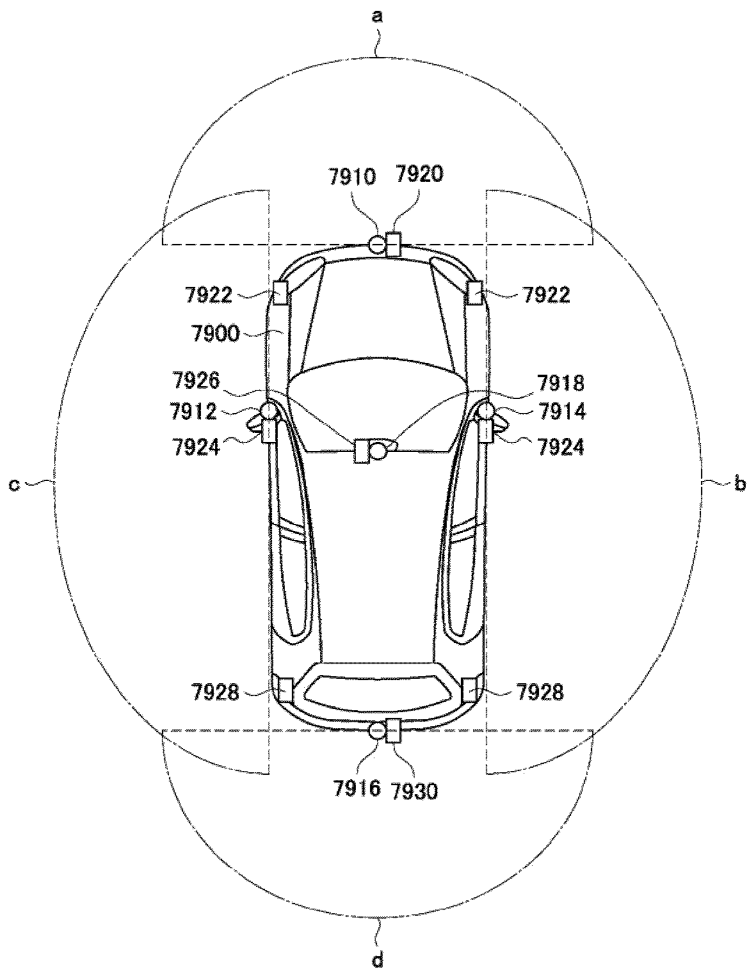
FIG. 11 is a diagram of assistance in explaining an example of installation positions of an outside-vehicle information detecting section and an imaging section.

FIG. 11 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the out-side-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The out-side-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol sup-ported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of object recognition circuitry or object recognition training circuitry according to the present disclosure can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the object recognition circuitry to the present disclosure can be applied to the integrated control unit 7600 in the application example depicted in FIG. 10.

In addition, at least part of the constituent elements of the object recognition circuitry may be implemented in a module (for example, an integrated circuit module formed with a single die) for the integrated control unit 7600 depicted in FIG. 10. Alternatively, the object recognition circuitry may be implemented by a plurality of control units of the vehicle control system 7000 depicted in FIG. 10.

Figure 12:
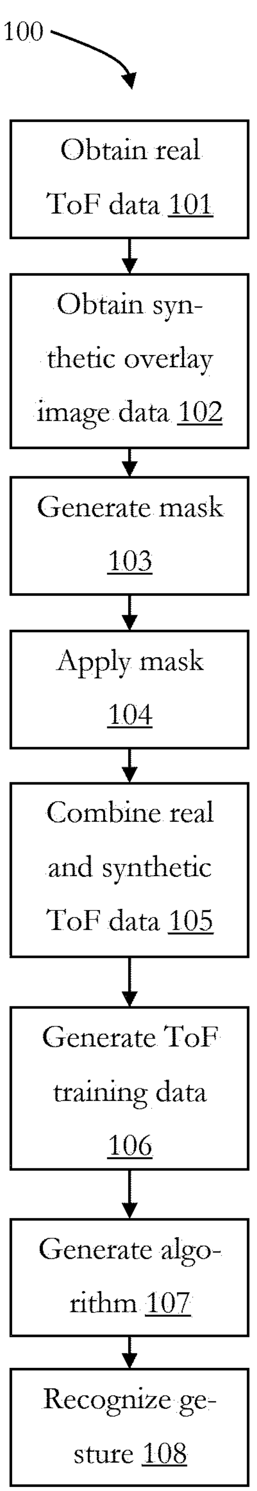
FIG. 12 depicts an object recognition training method according to the present disclosure in a block diagram.

FIG. 12 depicts an object recognition training method 100 according to the present disclosure in a block diagram.

At 101, real ToF data are obtained from a storage storing a plurality of depth images.

At 102, synthetic overlay image data 102 are obtained from a storage storing the synthetic overlay image data indicating a simulated object.

At 103, a mask generated based on binarizing, erosion, and blurring, as discussed herein. Furthermore, as discussed herein, the mask is generated based on an application of a random brightness change, a uniform brightness noise and based on balancing the synthetic overlay image data based on the background At 104, the mask is applied to the synthetic overlay image data.

At 105, the real and synthetic ToF data are combined, such that resulting ToF data indicate the object to be recognized (based on the simulated ToF data) and the background (based on the real ToF data), as discussed herein.

Thereby, at 106 ToF training data are generated, which further include bounding box information and pixel precise masking information, and wherein the ToF training data represent both depth image data and confidence data.

The ToF training data are further generated, at 106, based on random data augmentation and hyperparameter tuning, wherein early stopping is applied, as discussed herein.

At 107, an algorithm is generated for recognizing a real object based on the ToF training data, in a CNN, as discussed herein. The algorithm is further generated based on early stopping, as discussed herein.

At 108, a gesture of a hand, as the real object, is recognized for validating the algorithm.

It should be recognized that the embodiments describe methods with an exemplary ordering of method steps. The specific ordering of method steps is however given for illustrative purposes only and should not be construed as binding. For example the ordering of 12 and 13 in the embodiment of FIG. 2 may be exchanged. Also, the ordering of 101 and 102 in the embodiment of FIG. 12 may be exchanged. Other changes of the ordering of method steps may be apparent to the skilled person.

Please note that the division of the object detection circuitry 87 into units 88 and 89 is only made for illustration purposes and that the present disclosure is not limited to any specific division of functions in specific units. For instance, the object detection circuitry 87 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An object recognition method for time-of-flight camera data, comprising:

recognizing a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

(2) The object recognition method of (1), wherein the mask is based on at least one of a binarization of the simulated object, an erosion of the simulated object and a blurring of the simulated object.

(3) The object recognition method of (1) or (2), wherein the mask is based on an application of at least one of the following to the simulated object: a random brightness change, a uniform brightness noise, and balancing the synthetic overlay image data based on the background.

(4) The object recognition method of anyone of (1) to (3), wherein the pretrained algorithm is based on at least one of a generative adversarial network, a convolutional neural network, a recurrent neural network, and a convolutional neural network in combination with a neural network with a long short-term memory.

(5) The object recognition method of anyone of (1) to (4), wherein the time-of-flight training data further include at least one of bounding box information and pixel precise masking information.

(6) The object recognition method of anyone of (1) to (5), wherein the time-of-flight training data represent at least one of time-of-flight image data and time-of-flight confidence data.

(7) The object recognition method of anyone of (1) to (6), wherein the time-of-flight training data are further based on at least one of random data augmentation and hyperparameter tuning.

(8) The object recognition method of anyone of (1) to (7), wherein the pretrained algorithm is further trained based on early stopping.

(9) The object recognition method of anyone of (1) to (8), wherein the real object includes a hand.

(10) The object recognition method of anyone of (1) to (9), the method further comprising: recognizing a gesture of the hand.

(11) A computer program comprising program code causing a computer to perform the method according to anyone of (1) to (10), when being carried out on a computer.

(12) A non-transitory computer-readable recording medium that stores therein a computer program product, which, when executed by a processor, causes the method according to anyone of (1) to (10) to be performed.

(13) Time-of-flight object recognition circuitry for recognizing an object in time-of-flight camera data, configured to:

recognize a real object based on a pretrained algorithm, wherein the pretrained algorithm is trained based on time-of-flight training data, wherein the time-of-flight training data are generated based on a combination of real time-of-flight data being indicative of a background, and simulated time-of-flight data generated by applying a mask on synthetic overlay image data representing a simulated object, thereby generating a masked simulated object, the mask being generated based on the synthetic overlay image data.

(14) The time-of-flight object recognition circuitry of (13), wherein the mask is based on at least one of a binarization of the simulated object, an erosion of the simulated object and a blurring of the simulated object.

(15) The time-of-flight object recognition circuitry of (13) or (14), wherein the mask is based on an application of at least one of the following to the simulated object: a random brightness change, a uniform brightness noise, and balancing the synthetic overlay image data based on the background.

(16) The time-of-flight object recognition circuitry of anyone of (13) to (15), wherein the pretrained algorithm is based on at least one of a generative adversarial network, a convolutional neural network, a recurrent neural network, and a convolutional neural network in combination with a neural network with a long short-term memory.

(17) The time-of-flight object recognition circuitry of anyone of (13) to (16), wherein the time-of-flight training data further include at least one of bounding box information and pixel precise masking information.

(18) The time-of-flight object recognition circuitry of anyone of (13) to (17), wherein the time-of-flight training data represent at least one of time-of-flight image data and time-of-flight confidence data.

(19) The time-of-flight object recognition circuitry of anyone of (13) to (18), wherein the time-of-flight training data are further based on at least one of random data augmentation and hyperparameter tuning.

(20) The time-of-flight object recognition circuitry of anyone of (13) to (19), wherein the pretrained algorithm is further trained based on early stopping.

(21) The time-of-flight object recognition circuitry of anyone of (13) to (20), wherein the real object includes a hand.

(22) The time-of-flight object recognition circuitry of (21), further configured to:

recognize a gesture of the hand.

(23) An object recognition training method for time-of-flight camera data, comprising:

generating time-of-flight training data based on a combination of real time-of-flight data being indicative of a background, and simulated time-of-flight data generated by applying a mask on synthetic overlay image data representing a simulated object, thereby, generating a masked simulated object, the mask being generated based on the synthetic overlay image data.

(24) The object recognition training method of (23), further comprising:

obtaining the real time-of-flight data.

(25) The object recognition method of (23) or (24), further comprising:

obtaining synthetic overlay image data.

(26) The object recognition training method of (25), further comprising:

generating a mask based on the synthetic overlay image data.

(27) The object recognition training method of (26), further comprising:

generating the mask based on at least one of a binarization of the simulated object, an erosion of the simulated object and a blurring of the simulated object.

(28) The object recognition training method of (26) or (27), further comprising:

generating the mask based on an application of at least one of the following to the simulated object: a random brightness change, a uniform brightness noise, and balancing the synthetic overlay image data based on the background.

(29) The object recognition training method of anyone of (26) to (28), further comprising:

applying the mask on the synthetic overlay image data, thereby generating the simulated time-of-flight data.

(30) The object recognition training method of anyone of (23) to (29), further comprising: combining the real time-of-flight data and the simulated time-of-flight data, thereby generating the time-of-flight training data.

(31) The object recognition training method of anyone of (23) to (30), further comprising:

generating an algorithm for recognizing the real object based on the time-of-flight training data based on at least one of a generative adversarial network, a convolutional neural network, a recurrent neural network, and a convolutional neural network in combination with a neural network with a long short-term memory.

(32) The object recognition training method of anyone of (23) to (31), wherein the time-of-flight training data further include at least one of bounding box information and pixel precise masking information.

(33) The object recognition training method of anyone of (23) to (32), wherein the time-of-flight training data represent at least one of time-of-flight image data and time-of-flight confidence data.

(34) The object recognition training method of anyone of (23) to (33), further comprising:

generating the time-of-flight training data further based on at least one of random data augmentation and hyperparameter tuning.

(35) The object recognition training method of anyone of (23) to (34), further comprising: generating an algorithm for recognizing the real object based on early stopping.

(36) The object recognition training method of anyone of (23) to (35), wherein the real object includes a hand.

(37) The object recognition training method of (36), the method further comprising:

recognizing a gesture of the hand.

(38) A computer program comprising program code causing a computer to perform the method according to anyone of (21) to (37), when being carried out on a computer.

(39) A non-transitory computer-readable recording medium that stores therein a computer program product, which, when executed by a processor, causes the method according to anyone of (21) to (37) to be performed.

The invention claimed is:

1. An object recognition method, comprising:

recognizing a real object captured by an imaging processor of a first camera based on a pretrained algorithm, wherein the pretrained algorithm is trained based on training data having depth components, wherein the training data are generated based on a combination of real data having depth components derived from interpretation of data from a second camera and being indicative of a background, and simulated second data having depth components generated by applying a mask on synthetic overlay image data representing a simulated object, thereby generating a masked simulated object, the mask being generated based on the synthetic overlay image data, wherein the training data have depth components representing both depth image data and confidence data of an image.

2. The object recognition method of claim 1, wherein the mask is based on at least one of a binarization of the simulated object, an erosion of the simulated object and a blurring of the simulated object.

3. The object recognition method of claim 1, wherein the mask is based on an application of at least one of the following to the simulated object: a random brightness change, a uniform brightness noise, and balancing the synthetic overlay image data based on the background.

4. The object recognition method of claim 1, wherein the pretrained algorithm is based on at least one of a generative adversarial network, a convolutional neural network, a recurrent neural network, and a convolutional neural network in combination with a neural network with a long short-term memory.

5. The object recognition method of claim 1, wherein the training data having depth components further include at least one of bounding box information and pixel precise masking information.

6. The object recognition method of claim 1, wherein the training data having depth components represent at least one of depth image data and confidence data of an image.

7. The object recognition method of claim 1, wherein the training data having depth components are further based on at least one of random data augmentation and hyperparameter tuning.

8. The object recognition method of claim 1, wherein the real data having depth components is time-of-flight data and the simulated second data is simulated time-of-flight data.

9. The object recognition method of claim 1, wherein the real object includes a hand.

10. The object recognition method of claim 9, the method further comprising: recognizing a gesture of the hand.

11. Object recognition circuitry for recognizing an object in camera data, configured to:

recognize a real object based on a pretrained algorithm, wherein the pretrained algorithm is trained based on training data having depth components, wherein the training data are generated based on a combination of real data having depth components being indicative of a background, and simulated second data generated by applying a mask on synthetic overlay image data representing a simulated object, thereby generating a masked simulated object, the mask being generated based on the synthetic overlay image data, wherein the training data have depth components representing both depth image data and confidence data of an image.

12. The object recognition circuitry of claim 11, wherein the mask is based on at least one of a binarization of the simulated object, an erosion of the simulated object and a blurring of the simulated object.

13. The object recognition circuitry of claim 11, wherein the mask is based on an application of at least one of the following to the simulated object: a random brightness change, a uniform brightness noise, and balancing the synthetic overlay image data based on the background.

14. The object recognition circuitry of claim 11, wherein the pretrained algorithm is based on at least one of a generative adversarial network, a convolutional neural network, a recurrent neural network, and a convolutional neural network in combination with a neural network with a long short-term memory.

15. The object recognition circuitry of claim 11, wherein the training data having depth components further include at least one of bounding box information and pixel precise masking information.

16. The object recognition circuitry of claim 11, wherein the training data having depth components represent at least one of depth image data and confidence data of an image.

17. The object recognition circuitry of claim 11, wherein the training data having depth components are further based on at least one of random data augmentation and hyperparameter tuning.

18. The object recognition circuitry of claim 11, wherein the pretrained algorithm is further trained based on early stopping.

19. The object recognition circuitry of claim 11, wherein the real object includes a hand.

20. The object recognition circuitry of claim 19, further configured to:

recognize a gesture of the hand.

* * * * *